Feb. 14, 1967  A. PHILLIPS  3,304,553
GALVANOMETER CONTROLLED RECORDER
Filed March 22, 1965  2 Sheets-Sheet 1
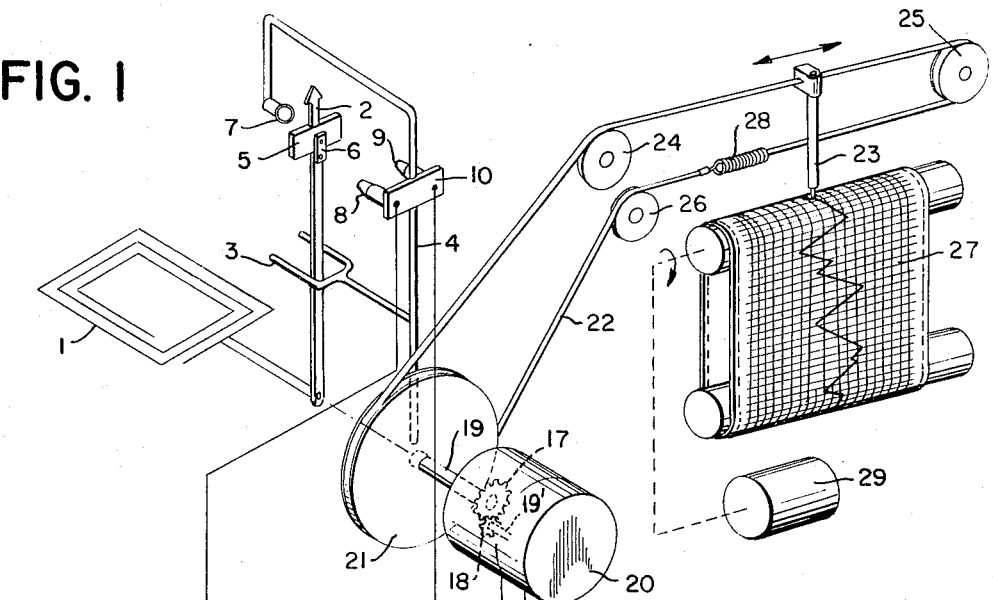
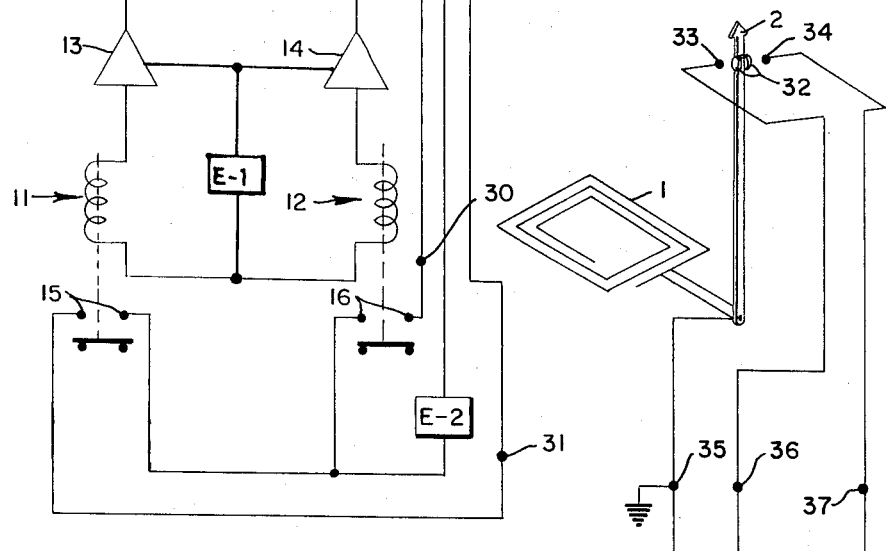
INVENTOR.
ADOLPH PHILLIPS
BY
Nolte and Nolte
ATTORNEYS Feb. 14, 1967 A. PHILLIPS 3,304,553
GALVANOMETER CONTROLLED RECORDER
Filed March 22, 1965 2 Sheets-Sheet 2

INVENTOR.
ADOLPH PHILLIPS
BY
Nolte and Nolte
ATTORNEYS

United States Patent Office 3,304,553
Patented Feb. 14, 1967

3,304,553
GALVANOMETER CONTROLLED RECORDER
Adolph Phillips, New York, N.Y.
Filed Mar. 22, 1965, Ser. No. 441,725
6 Claims. (Cl. 346—31)

This is a continuation-in-part of application Serial No. 292,610 for graphic recording instruments, filed on July 3, 1963 by the present inventor and now abandoned.

This invention relates to graphic recording instruments and more specifically to galvanometrically controlled recorders.

One of the objects of this invention is to provide a compact, low-cost instrument having the desirable characteristics of high cost recorders, namely the use of ordinary writing ink, wide chart paper, a linear scale, and a high torque pen, without, however, utilizing relatively expensive parts of potentiometer recorders or direct writing galvanometer recorders.

Another object of this invention is to separate the galvanometer proper from the recorder proper thereby removing the mechanical load of the recorder from the galvanometer.

A further object of this invention is the control of the recorder by the galvanometer movement by means of a so-called bang-bang servo mechanism type of apparatus.

A more specific object of this invention is to use a galvanometer control pointer cooperating with switching means to control a motor which operates the recording pen.

These and other objects of the invention will be more readily apparent from the drawings annexed herein, in which:

FIG. 1 shows a mechanical and electrical diagram, partly schematic, showing a preferred embodiment of this invention;

FIG. 2 represents a modification of the embodiment shown in FIG. 1;

FIG. 5 shows an electrical diagram of the motor brake circuit.

Figure 3:
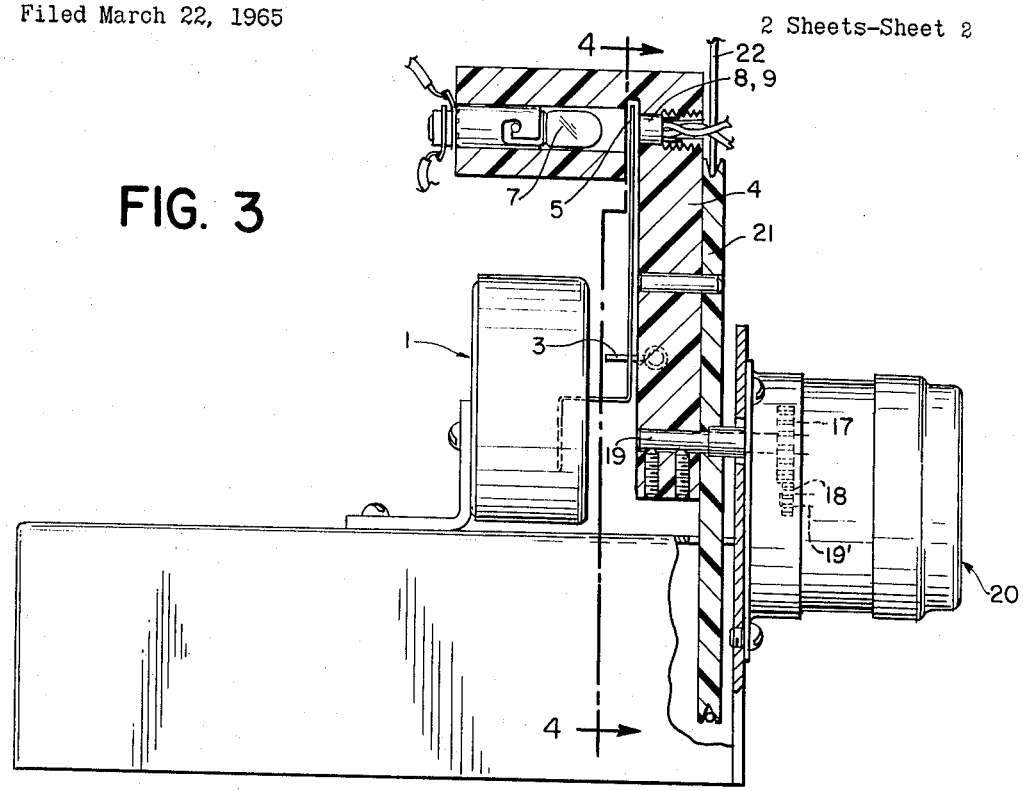
FIG. 3 is a side elevation, partly in section, of the embodiment shown in FIG. 1.
Figure 4:
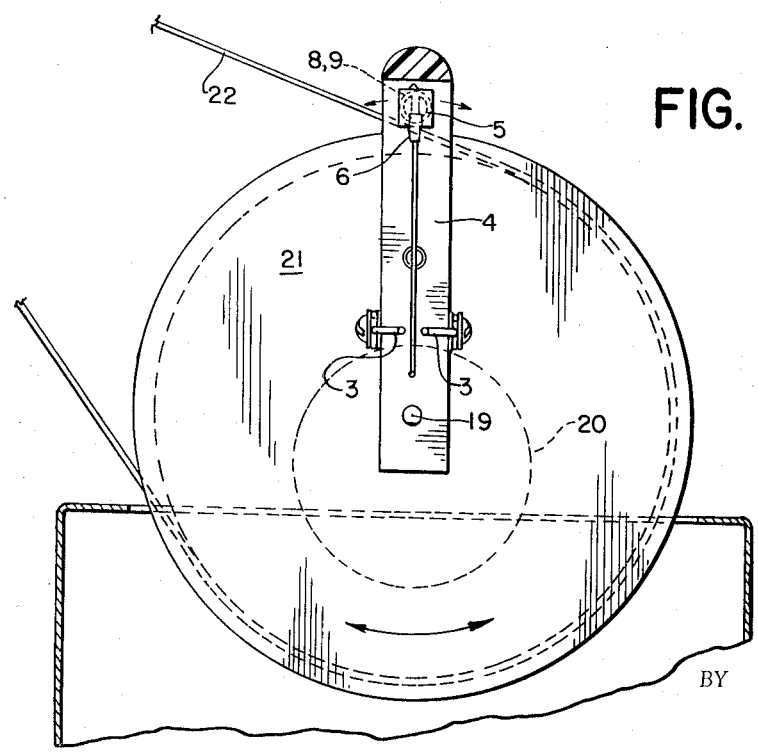
FIG. 4 is a section taken along the line 4—4 of FIG. 3.

The apparatus illustrated in FIGS. 1, 3 and 4 consists of a low torque d'Arsonval galvanometer of which the coil 1 is shown operating a pointer 2 which has a scale deflection calibrated to correspond to the range of values to be measured. Galvanometer 1 can be of a jewel pivot type or of the taut band type. In the embodiment shown, meter pointer 2 is closely surrounded by hasp 3 which is mounted on bracket 4, thereby restricting the movement of pointer 2 up or down scale. A light shutter 5 is attached to the pointer 2 by means of clamp 6.

A light source 7, which is provided electrical energy by conventional means (not herein shown) is mounted at one end of bracket 4 and is vertically positioned to lie in the same plane as shutter 5. Photo cells 8, 9 mounted on bracket 4 lie in the same horizontal plane as do light 7 and shutter 5. In this configuration shutter 5 lies intermediate light 7 and photo cells 8, 9. The photo cells are mounted on bracket 10 which in turn is mounted on bracket 4.

When pointer 2 is in its normal position, shutter 5 is so positioned so that the light from light source 7 does not fall on either of the photo sensitive cells 8 and 9. When pointer 2 is rotated, due to the electrical signal being measured, light energy will impinge upon either light photo cell 8 or photo cell 9. When light falls upon one of the photo sensitive cells, the effective resistance of the cell becomes substantially less, thereby placing the transistorized amplifiers 13 or 14 in a conducting state.

The voltage source E-1 now causes current to flow through sensitive relays 11 or 12 thereby energizing the relay depending on which of the photo cells has been activated by the light source.

When pointer 2 is so caused to move due to the signal being measured, pointer 2 will strike against hasp 3 which will restrain the motion of pointer 2. Accordingly, the angular velocity of pointer 2 will not exceed the angular velocity of bracket 4 which follows pointer 2 in the manner described below.

Accordingly, shutter 5 will always cover at least one of the photo sensitive cells 8 or 9, thereby insuring the proper operation of the invention.

The other end of bracket 4 is mounted on pulley 21 which is operatively connected to shaft 19 through gears 17 and 18, so that speed reduction is achieved. Shaft 19 extends from pen motor 20, which is a reversible device rotatable in either a clockwise or a counterclockwise direction, depending on which of terminals of motor 20 voltage source E-2 is applied as discussed below. Cord 22 is placed around the circumference of pulley 21.

Cord 22, to which is attached writing pen 23 is driven over rotatable pulleys 24, 25 and 26 by the rotation of shaft 19, and is held in contact to chart paper 27 by the tension in cord 22 produced by tension spring 28. Chart paper 27 is pulled perpendicularly to the movement of the pen by chart motor 29. Strip chart 27 can be replaced by a disc chart or any other suitable chart without departing from the scope of this invention.

The recorder described above operates in the following manner. As the pointer 2 is rotated due to movement of coil 1, the light emanating from light source 7 impinges on either of the photo electric cells 8 or 9, due to the motion of shutter 5 which is connected to pointer 2.

As previously described, the impinging of light upon the photo cells closes a circuit containing voltage source E-1, and transistorized amplifiers 13 and 14 to energize relay coils 11 or 12. The energizing of the relay coils in turn closes relay contacts 15 or 16. Voltage source E-2 is thereby connected through either of the closed contacts to either terminal 30 or terminal 31 of pen motor 20 so that pen motor 20 will rotate either clockwise or counterclockwise depending upon which of the two contacts voltage source E-2 is applied to. E-2 may be either a direct current or an alternating current source.

Simultaneously, the gearing connections are so arranged that pen motor 20 acting through shaft 19' and gear 18, will produce rotation in gear 17 in the same direction as the rotation of pointer 2 which, as shall be recalled, initiated the rotation of pen motor 20. Simultaneously, pulley 21 moves pen stylus 23 via cord 22 across chart paper 27 through a displacement proportional to the rotation of pen motor 20.

Bracket 4, which is connected to pulley 21, will rotate along with gear 17 until it lines up with shutter 5 at which point the shutter 5 will prevent light from impinging upon either photo cell 8 or 9.

When no light impinges on the photo cells, the circuit is opened and therefore, relay coils 11 or 12 will be de-energized and the relay contacts 15 or 16 will open, thereby disconnecting voltage source E-2 from motor 20. The rotation of pen motor 20 is thereby stopped as is the movement of pen 23 along chart paper 27.

It is therefore apparent that pen stylus 23 will produce a recordation on chart paper 27 which is proportional to, or under, any other predetermined control by the movement of meter pointer 2.

An alternative embodiment of this invention, shown in FIG. 2, utilizes physical contacts in conjunction with the moving pointer to activate the reversible pen motor.

An electrical contact 32 attached to moving pointer 2, cooperates with a pair of electrical contacts 33 and 34, of the type used in so-called meter relays. Contact 32 may be grounded either directly to the meter frame or by conection to terminal 35.

Contacts 33 and 34 which extend to terminals 36 and 37 are positioned on either side of, and in close proximity to, electrical contact 32 which is supported on pointer 2. Normally contact 32 is not in physical contact with contacts 33 and 34. The contact elements 33 and 34 are rigidly supported on an insulated gear 17 so as to move together with gear 17. Terminals 36 and 37 are connected to sensitive relays 11 and 12 respectively.

When pointer 2 is actuated by an input signal being measured, it forces contact element 32 against either contact 33 or 34, depending upon whether the reading being measured moves the pointer upscale or downscale. When contact 32 makes contact with either contact 33 or 34, a circuit, including voltage source E-1 is completed thereby applying voltage source E-1 to either relay 11 or relay 12, thereby closing either contacts 15 or contacts 16.

The remainder of the operation of the reversible motor, gearing and recording system is identical to that operation as described in the discussion of the embodiment which was shown in FIG. 1 and described above.

The scale on chart paper 27 may also be linear or otherwise predeterminably related to the meter movement of pointer 2.

Motor 20 may also be used to control other operations without departing from the scope of this invention.

To further improve the accuracy of the recorder, it is possible to apply a braking force to the motor when the energizing voltage is removed, thus preventing any undesired rotation of the motor due to the mechanical inertia of the motor.

This can be achieved by placing a braking voltage on to the windings from a charging capacitor, which is charged over the period in which the motor is energized. It would also be possible to apply a mechanical braking force to the motor upon the de-energization of the relays.

While the invention has been shown and described by means of a certain mechanical and electrical circuit configuration and their interconnections, this invention should not be limited thereto since modifications may be made thereto within the spirit of the invention which is defined and outlined by the scope of the appended claims.

What is claimed is:

1. A recording instrument for graphically recording the magnitude of an electrical signal upon a recording medium comprising: a meter responsive to the magnitude of said electrical signal, said meter including a member, movable in dependence upon said magnitude; a bracket; first and second sensing means attached to said bracket responsive to the movement of said member, said first and second sensing means comprising first and second photosensitive cells and a light source spaced from said first and second photo-sensitive cells, a shutter connected to said member and positioned between said ilght source and said first and second photosensitive cells and positioned in coplanar relation in alignment therewith in a manner whereby said light source energizes one of said first and second photosensitive cells when said shutter is moved out of alignment with one of said first and second photosensitive cells; first and second circuit closing means activated by said sensing means, depending upon the direction of the movement of said member; a reversible motor, the direction of the motion of which is dependent upon which of said circuit closing means is activated; means for causing rotation of said motor responsive to said first and second circuit closing means; a recording pen operatively connected to said motor and in operative contact with said recording medium; gearing means operatively connecting said motor to said bracket whereby said first and second sensing means attached to said bracket are moved into direct alignment with the shutter connected to said member, thereby removing the activation of said circuit closing means which in turn removes said rotation causing means from said motor preventing further motion of said motor.

2. A recording instrument according to claim 1 wherein said first and second circuit closing means comprise relay coils electrically connected to and adapted to be energized by the photosensitive cells of said first and second sensing means and relay contacts in operative proximity with said relay coils, said relay contacts being closed upon the energizing of corresponding relay coils.

3. A recording instrument according to claim 1, wherein said first and second sensing means comprise electrical contacts and said movable member comprises electrical conducting means for completing an electrical circuit through one of said electrical contacts by making electrical contact therewith.

4. A recording instrument according to claim 1, also comprising means for applying a braking force to said reversible motor when said first and second circuit closing means are deactivated.

5. A recording instrument according to claim 1, also comprising means attached to said bracket for limiting the oscillatory movement of said member so that no more than one of said first and second sensing means can be actuated at any given time.

6. A recording instrument as claimed in claim 1, wherein said gearing means includes a pulley wheel driven by said motor, said bracket being affixed to said pulley wheel for rotation therewith and said recording instrument further comprising coupling means mechanically coupling said pulley wheel and said recording pen.

References Cited by the Examiner

UNITED STATES PATENTS

| | | | |
|---|---|---|---|
| 1,678,865 | 7/1928 | Lincoln | 236—69 X |
| 1,822,075 | 9/1931 | Aronoff | 346—32 X |
| 1,827,520 | 10/1931 | Harrison | 318—28 X |
| 1,930,496 | 10/1933 | Wilson et al. | 317—125 X |
| 2,216,472 | 10/1940 | Harrison | 317—125 X |

RICHARD B. WILKINSON, *Primary Examiner.*

LOUIS J. CAPOZI, *Examiner.*

J. W. HARTARY, *Assistant Examiner.*